United States Patent
Suzuki et al.

[11] Patent Number: 5,876,833
[45] Date of Patent: Mar. 2, 1999

[54] MAGNETIC RECORDING MEDIUM CONTAINING MAGNETIC POWDER AND A POLYURETHANE BINDER HAVING A SPECIFIED RADIUS OF GYRATION

[75] Inventors: Masaki Suzuki; Hiroshi Hashimoto; Satoshi Matsubaguchi; Hiroaki Takano, all of Kanagawa, Japan

[73] Assignee: Fuji Photo Film Co., Ltd., Japan

[21] Appl. No.: 956,796

[22] Filed: Oct. 23, 1997

Related U.S. Application Data

[63] Continuation-in-part of Ser. No. 646,847, May 8, 1996, abandoned.

[30] Foreign Application Priority Data

May 10, 1995 [JP] Japan ................................. 7-135769

[51] Int. Cl.$^6$ .................................................. G11B 5/702
[52] U.S. Cl. .......................... 428/141; 428/328; 428/329; 428/336; 428/425.9; 428/694 BU; 428/694 BA; 428/694 BR; 428/900
[58] Field of Search ..................... 428/329, 336, 428/425.9, 694 BU, 694 BA, 694 BR, 900, 328, 141

[56] References Cited

U.S. PATENT DOCUMENTS

| | | |
|---|---|---|
| 3,026,215 | 3/1962 | Fukuda et al. . |
| 3,031,341 | 4/1962 | Eschenfelder . |
| 3,100,194 | 8/1963 | van der Bargt et al. . |
| 3,242,005 | 3/1966 | Morita et al. . |
| 3,389,014 | 6/1968 | Arashi et al. . |
| 4,637,959 | 1/1987 | Ninomiya et al. .................... 428/425.9 |
| 4,812,369 | 3/1989 | Hanai et al. .......................... 428/425.9 |
| 4,863,793 | 9/1989 | Ogawa et al. . |
| 5,357,036 | 10/1994 | Miyata et al. ........................... 528/373 |
| 5,415,941 | 5/1995 | Sugyo et al. .......................... 428/425.9 |
| 5,496,607 | 3/1996 | Inaba et al. . |
| 5,578,376 | 11/1996 | Hashimoto et al. .................. 428/425.9 |

FOREIGN PATENT DOCUMENTS

| | | |
|---|---|---|
| 63-187418 | 8/1988 | Japan . |
| 5-298653 | 11/1993 | Japan . |

OTHER PUBLICATIONS

Encyclopedia of Polymer Science and Engineering, John Wiley & Sons, 1987, pp. 786–792.

*Primary Examiner*—Stevan A. Resan
*Attorney, Agent, or Firm*—Brinks Hofer Gilson & Lione

[57] ABSTRACT

A magnetic recording medium is disclosed, comprising a magnetic layer mainly comprising a ferromagnetic powder and a binder resin formed on at least one side of a non-magnetic support, wherein said magnetic layer has a thickness of from 0.05 μm to 0.8 μm, said ferromagnetic powder has an average long axis length of from 0.05 μm to 0.20 μm, and said binder resin comprises a polyurethane having a radius of gyration from 5 to 25 nm in cyclohexanone.

18 Claims, No Drawings

MAGNETIC RECORDING MEDIUM CONTAINING MAGNETIC POWDER AND A POLYURETHANE BINDER HAVING A SPECIFIED RADIUS OF GYRATION

The present application is a continuation-in-part of Ser. No. 08/646,847 filed May 8, 1996 now abandoned, the entire contents of which are incorporated herein by reference.

FIELD OF THE INVENTION

The present invention relates to a magnetic recording medium, particularly a coating type magnetic recording medium adapted for the recording/reproduction of digital signal at a high density.

BACKGROUND OF THE INVENTION

Magnetic recording media are widely used for recording tape, video tape, computer tape, disc, etc. The recording density of magnetic recording media have become higher and higher, and their recording wavelength has become shorter and shorter every year. As the recording system for such the magnetic recording media there have been studied analog system as well as digital system.

The so-called coating type magnetic recording medium which comprises a dispersion of a ferromagnetic powder in a binder coated on a support to meet the requirement for higher density has a low packing density of magnetic material and deteriorated electromagnetic characteristics than the thin metal film type magnetic recording medium. However, the coating type magnetic recording medium can exhibit almost the same properties as that of the thin metal film type magnetic recording medium because of the recent development of magnetic materials and rapid progress of the technique for coating an extremely thin layer. Further, the coating type magnetic recording medium is excellent from the standpoint of practical reliability such as productivity and corrosion resistance.

As such the coating type magnetic recording medium there has been widely used a magnetic recording medium comprising a magnetic layer having a ferromagnetic iron oxide, Co-modified ferromagnetic iron oxide, $CrO_2$, ferromagnetic alloy powder or the like dispersed in a binder coated on a non-magnetic support.

The enhancement of the electromagnetic characteristics of the coating type magnetic recording medium may be accomplished, e.g., by improvement of the magnetic properties of the ferromagnetic powder, smoothening of the surface thereof, etc. Various approaches have been proposed but leave something to be desired for the demand for higher density. The recent trend is for shorter recording wavelength with higher density. A problem of self demagnetization loss during recording or thickness loss during reproduction causing output drop is generated if the magnetic layer is too thick. Thus, an extremely thin coating type magnetic recording medium has been proposed.

In recent years, a so-called ME (metal-evaporated) tape on which a thin metal has been vapor-deposited (vacuum-evaporated) has been put into practical use in the field of Hi-8 and digital VCR for consumers' use. Thus, a system which employs both an alloy powder tape, i.e., so-called MP (metal particulate) and such an ME tape has been put into practical use.

In order to render MP tape compatible with ME tape, MP tape must have a magnetic layer with a reduced thickness to provide a higher output as in ME tape. Further, MP tape must have the same relationship between recording current and reproduced output as that in ME tape. Heretofore, as the recording current increases, MP tape gives a lower reproduced output due to recording demagnetization. However, ME tape doesn't show this tendency. ME tape shows a tendency for saturation of reproduced output with increase of the recording current. Therefore, Hi-8 decks actually employ a system in which recording is performed with different currents between MP tape and ME tape. However, this system is disadvantageous in that it requires a complicated circuit. In order to eliminate this difficulty, it is necessary that the same recording current be used in the system in which MP tape and ME tape are compatible with each other. However, there arises a difficulty that when recording and reproduction are performed on MP tape with a recording current optimum for ME tape, the resulting output is lowered. Further, when recording and reproduction are performed on ME tape with a recording current optimum for MP tape, ME tape cannot make the best use of its capacity, lowering the resulting output. It has thus been desired to make the optimum recording current for MP tape almost equal to that for ME tape.

In digital VCR's for consumers' use, a signal having a recording wavelength of 22 $\mu$m has been used as a synchronization signal, and a signal having a recording wavelength of 0.488 $\mu$m has been used for data recording. Further, in order to reduce the weight of the apparatus, the erasing head has been omitted, and an overwriting erasion system has been employed. In order to employ the overwriting erasion system, it is necessary that the synchronization signal be erased by the data signal. It is said that the overwriting erasure is preferably not more than −20 dB. It is preferred that the overwriting erasure be as low as possible to meet the requirements for magnetic recording medium. The thinner the magnetic layer is, the better are the overwriting characteristics. However, if the thickness of the magnetic layer is simply reduced, the total magnetization amount is reduced, thereby lowering the reproduced output of a long wavelength signal such as synchronization signal. In order to enhance the output of long wavelength signal, a large magnetization amount is needed. To this end, a high magnetic flux density and a certain thickness must be assured. As mentioned above, the overwrite characteristics and the output of long wavelength signal conflict with each other. However, the enhancement of the overwriting erasure can be accomplished not only by reducing the thickness of the magnetic layer but also by recording a short wavelength signal such as data signal deep into the magnetic layer. To this end, it is effective to allow the passage of as much recording current as possible upon the recording of data signal. As previously mentioned, in order to make MP tape compatible with ME tape, it is desirable that the optimum recording current for MP tape be as much as that for ME tape. This is desirable also from the standpoint of overwrite characteristics.

Besides the above-mentioned factors for the enhancement of overwrite characteristics, it is desirable that the surface of the magnetic layer be as smooth as possible so far as the running durability permits. It has been found that the higher the squareness ratio of the magnetic layer is, or the lower SFD (viz., Switching Field Distribution) is, the better is the overwrite characteristics thereof.

In order to improve the running durability, it has been a common practice to properly select a binder resin to be incorporated in the magnetic layer.

By way of example, a polyurethane which can form a rigid film having a high glass transition temperature (Tg) has been desirable to impart good durability to the magnetic layer. However, a polyurethane which form a film having a relatively low Tg has been selected from the standpoint of calenderability (i.e., improvement of performance in treatment for smoothing the surface of magnetic layer in addition to increasing the density of the magnetic layer, which is obtained by passing the magnetic tape at least one time through nip of a pair (nip) roll in which one of the rolls is a metal roll so that the magnetic layer comes in contact with the metal roll).

On the other hand, a magnetic recording medium which comprises a thinner magnetic layer provided on a non-magnetic layer has been known. However, in order to attain a higher recording density, it is necessary that the magnetic layer be thinner and the ferromagnetic metal powder be finer. The use of a finer ferromagnetic metal powder causes a drop of dispersibility and thus deteriorates the surface properties of the magnetic layer, thereby deteriorating the electromagnetic characteristics of the magnetic recording medium. Further, if the thickness of the magnetic layer is reduced, it is made difficult to secure sufficient durability.

For magnetic recording medium for digital VCR, a thin film head or MR head (viz., magnetoresistive reproducing head) is considered to be desirable. However, such the tape, if it comprises a vinyl chloride resin which has been widely used as a binder for magnetic recording medium, undergoes dehydrochlorination to release hydrochloric acid corroding the magnetic head even in a slight amount to cause troubles. Accordingly, a binder resin free of vinyl chloride has been desired.

The applicants have proposed an extremely thin layer type magnetic recording medium which comprises a thinner magnetic layer as an upper layer provided on a non-magnetic layer as a lower layer. Examples of these inventions will be given below.

U.S. Pat. No. 4,863,793 discloses a magnetic recording medium comprising a dispersion of a ferromagnetic powder having an average long axis length of less than 0.8 $\mu$m and a crystallite size of less than 300 Å coated on a non-magnetic layer.

U.S. Pat. No. 5,496,607 discloses a technique which comprises the definition of the thickness of the magnetic layer to less than 0.3 $\mu$m and the standard deviation of the thickness of the magnetic layer to a predetermined range to obtain a magnetic recording medium having a good overwrite characteristics and a less strain during digital recording.

However, these conventional techniques generally employ a polyurethane and a vinyl chloride resin as binder resin and thus leave something to be desired in the enhancement of overwrite characteristics and the assurance of output at low frequencies. Further, these conventional techniques can hardly meet the requirements of both running durability and prevention of head corrosion. In other words, sufficient running durability cannot be assured without any vinyl chloride resin. On the contrary, if any vinyl chloride resin is used, head corrosion cannot be inhibited. In particular, the conventional techniques leave something to be desired in overwrite characteristics and compatibility with ME tape in 24–25 modulation employed for digital VCR for consumers' use and running durability and corrosion resistance. Further, no binder resin systems free of vinyl chloride resin which can solve the foregoing problems have been found.

SUMMARY OF THE INVENTION

An object of the present invention is to provide a magnetic recording medium having good electromagnetic characteristics.

Another object of the present invention is to provide a magnetic recording medium which can fully meet the requirements for overwrite characteristics and compatibility with ME tape as well as running durability and corrosion resistance.

The foregoing objects of the present invention can be accomplished with a magnetic recording medium comprising a magnetic layer mainly comprising a ferromagnetic powder and a binder resin formed on at least one side of a non-magnetic support, wherein said magnetic layer has a thickness of from 0.05 $\mu$m to 0.8 $\mu$m, said ferromagnetic powder has an average long axis length of from 0.05 $\mu$m to 0.20 $\mu$m, and said binder resin comprises a polyurethane having a radius of gyration of from 5 to 25 nm in cyclohexanone.

DETAILED DESCRIPTION OF THE INVENTION

In accordance with the feature of the present invention, the selection of a polyurethane resin having a radius of gyration of from 5 to 25 nm in cyclohexanone as a binder resin makes it possible to not only provide the magnetic layer with a good dispersibility and good surface properties as well as an improved running durability but also allow an effective prevention of head corrosion even if the average long axis length of the ferromagnetic powder is as small as from 0.05 $\mu$m to 0.20 $\mu$m and the thickness of the magnetic layer is as extremely small as from 0.05 to 0.8 $\mu$m.

The polyurethane resin employable in the present invention has a radius of gyration of from 5 nm to 25 nm, preferably from 5 nm to 20 nm, more preferably from 7 nm to 20 nm.

The term "radius of gyration" as used herein is well-known in the art of polymer chemistry. In the present invention, the term means the value determined in a cyclohexanone solution of polyurethane by the light scattering method. Referring to the measurement conditions, a light-scattering photometer ("DLS700" manufactured by Otsuka Denshi K. K.) was used. The specimen concentration was 0.2%, 0.4%, 0.6% and 0.8% by weight in cyclohexanone solution.

In the present invention, a polyurethane resin the radius of gyration of which has been controlled to a range of from 5 nm to 25 nm is used. The greater the radius of gyration of the polyurethane is, the wider is the distribution of polyurethane molecules adsorbed to the surface of the ferromagnetic powder in the magnetic coating solution, and the better is the dispersibility. Further, the higher Tg of urethane is, the better is durability. However, if the radius of gyration of the polyurethane is increased at random, the dispersibility is reduced, deteriorating the orientability.

Since there are no inventions focusing on the radius of gyration of polyurethane and Tg of the tape is predetermined to not higher than the calendering temperature from the standpoint of caldenderability, urethanes having a high Tg have never been employed. The employment of a urethane having a high radius of gyration provides an improved dispersibility and makes it possible to assure a good formability even if a high Tg urethane is used under some calendering conditions. Thus, the electromagnetic characteristics and the durability can be improved at the same time. Examples of the method for controlling the radius of gyration of polyurethane to a predetermined value include a method which comprises controlling the urethane content or ether bond group concentration.

The urethane group content in the polyurethane is normally from 0.5 to 5 meq/g, preferably from 1.0 to 4 meq/g, more preferably from 1.5 to 3.0 meq/g. The ether group content in the polyurethane is normally from 0.5 to 9.0 meq/g, preferably from 1.0 to 7.0 meq/g, more preferably from 2.0 to 6.0 meq/g. The number-average molecular weight of the polyurethane is normally from 20,000 to 150,000, preferably from 30,000 to 100,000, more preferably from 40,000 to 70,000.

As calendering roll there can be used a roll made of a metal or a heat-resistant plastic such as epoxy, polyimide, polyamide and polyimideamide.

Referring to the calendering conditions, a calender comprising a pair of metal rolls in combination is preferred. The calendering temperature is from 60° C. to 110° C., preferably from 70° C. to 100° C., more preferably from 80° C. to 100° C. The linear pressure is normally from 100 to 500 Kg/cm, preferably from 200 to 400 Kg/cm, more preferably from 250 to 350 Kg/cm. In the present invention, a polyurethane is selected to allow high-temperature calendering that provides a good formability. Examples of the material of the metal roll include hard chromium-plated chromium steel. The center line average (surface) roughness (Ra) of the metal roll is normally from 0.001 to 0.05 nm, preferably from 0.001 to 0.01 nm.

The layer constitution of the magnetic recording medium of the present invention is not specifically limited so far as it comprises a magnetic layer provided at least one side of a non-magnetic support. A preferred embodiment of the layer constitution of the magnetic recording medium of the present invention comprises a non-magnetic layer mainly composed of an inorganic non-magnetic powder and a binder provided interposed between the magnetic layer and the non-magnetic support. The non-magnetic layer and the magnetic layer may each have a single layer structure or multi-layer structure. The term "magnetic layer thickness" as used herein means the total thickness of the various magnetic layers. With this arrangement, a smooth magnetic layer having excellent surface properties can be obtained.

The center line average (surface) roughness (Ra) of the magnetic layer of the present invention is normally from 1 nm to 4 nm, preferably from 1 nm to 3 nm.

Tg (glass transition temperature) of the magnetic layer of the present invention is normally not lower than 80° C., preferably from 85° C. to 95° C. When the magnetic recording medium has a multi-layer form, it is preferred that Tg of the uppermost layer be higher than that of the other layers. For example, Tg of the non-magnetic layer is normally from 30° C. to 90° C., preferably from 60° C. to 80° C.

As the binder resin to be incorporated in the magnetic layer of the present invention there may be used the foregoing polyurethane singly or in combination with other arbitrary binder resins. As the resins to be used in combination with the foregoing polyurethane there may be preferably used resins in which corrosive gas-generating resins such as vinyl chloride resin are excluded from the standpoint of prevention of corrosion of thin film head or MR head. Specific examples of the other binder resins in which the corrosive gas-generating resins are excluded include polyisocyanate. In the present invention, even if a polyurethane is used singly without any vinyl chloride resin which is commonly used for the purpose of strengthening the magnetic layer, a sufficient running durability is assured. However, the polyurethane resin may be used in combination with a vinyl chloride resin.

In the present invention, the content of polyurethane in the magnetic layer is normally from 50 to 300% by weight, preferably from 50 to 150% by weight based on the weight of ferromagnetic powder, and the content of other resins in the magnetic layer is normally from 20 to 200% by weight, preferably from 40 to 150% by weight based on the weight of ferromagnetic powder. When the vinyl chloride resin is used as the other resin in combination, the content of polyurethane is from 20 to 150% by weight, preferably from 30 to 70% by weight based on the weight of ferromagnetic powder.

When the polyisocyanate is used in combination, the content of polyisocyanate is normally from 20 to 100% by weight, preferably from 30 to 70% by weight based on the weight of ferromagnetic powder.

The ferromagnetic powder to be used in the present invention has an average long axis length of from 0.05 $\mu$m to 0.20 $\mu$m, preferably from 0.05 $\mu$m to 0.11 $\mu$m, more preferably from 0.06 $\mu$m to 0.09 $\mu$m. As the ferromagnetic powder there may be preferably used a ferromagnetic metal powder.

For the measurement of average long axis length, the following two methods may be properly used in combination. One of the two methods is to read out the short axis length and long axis length of ferromagnetic powder from a photograph taken by a transmission type electron microscope. The other method is to trace a transmission type electron microscope photograph by the image analyzer ("IBASS1" manufactured by Carl Zeiss Stiftuing Co., Ltd.).

The well-known ferromagnetic powders such as $\gamma$-FeOx (wherein x is 1.33 to 1.5), Co-modified-$\gamma$-FeOx (wherein x is 1.33 to 1.5) or a ferromagnetic metal powder containing $\alpha$-Fe, Ni or Co as a main component (the content: 75% or more) can be used as the ferromagnetic powder. Among these, the ferromagnetic alloy powder comprising $\alpha$-Fe as a main component is preferred.

Such the ferromagnetic powder may further contain atoms other than predetermined atoms, such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B. Particularly important among these elements to be incorporated other than $\alpha$-Fe in the case of magnetic metal material are Al, Si, Ca, Y, Ba, La, Nd, Co, Ni and B. Such the ferromagnetic powder may be treated with a dispersant, lubricant, surface active agent or antistatic agent as described later before dispersion. This is further described in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, and U.S. Pat. Nos. 3,026,215, 3,031,341, 3,100,194, 3,242,005, and 3,389,014.

Among the above mentioned ferromagnetic powders, the ferromagnetic alloy powder may contain a small amount of hydroxide or oxide. In order to prepare such a ferromagnetic alloy powder, well-known preparation methods can be used. These methods include a method which comprises the reduction with a composite organic acid salt (mainly oxalate) and a reducing gas such as hydrogen, a method which comprises the reduction of iron oxide with a reducing gas such as hydrogen to obtain Fe or Fe—Co particles, a method which comprises the pyrolysis of a metallic carbonyl compound, a method which comprises adding a reducing agent such as sodium borohydride, hypophosphite and hydrazine to an aqueous solution of a ferromagnetic metal to reduce the ferromagnetic metal, and a method which comprises the evaporation of a metal in an inert gas under reduced pressure to obtain a finely divided powder. The ferromagnetic alloy powder thus obtained may be subjected to a well-known gradual deoxidation treatment such as process which comprises dipping the ferromagnetic alloy powder in an organic solvent, and then drying the material, process which comprises dipping the ferromagnetic alloy powder in an organic solvent with an oxygen-containing gas bubbled thereinto to form an oxide film on the surface of the ferromagnetic alloy powder, and then drying the material, and process which comprises controlling the partial pressure of oxygen gas and inert gas instead of using an organic solvent to form an oxide film on the surface of the ferromagnetic alloy powder.

The ferromagnetic powder to be incorporated in the magnetic layer of the present invention exhibits a specific surface area of generally from 45 to 80 m$^2$/g, preferably from 50 to 70 m$^2$/g as determined by BET method. If the specific surface area is below 45 m$^2$/g, the resulting magnetic recording medium suffers from a high noise. On the contrary, if the specific surface area exceeds 80 m$^2$/g, the desired surface properties cannot be easily obtained.

The crystallite size of the ferromagnetic powder to be incorporated in the magnetic layer of the present invention is in the range of generally from 80 to 350 Å, preferably from 100 to 250 Å, more preferably from 140 to 200 Å. The magnetic iron oxide powder exhibits a saturation magnetization (as) of preferably from 125 to 180 emu/g, more preferably from 110 to 170 emu/g, most preferably from 125 to 160 emu/g. The ferromagnetic powder exhibits a coercive force of preferably from 1,500 Oe to 3,500 Oe, more preferably from 1,800 Oe to 3,000 Oe. The ferromagnetic powder exhibits an acicularity ratio of preferably from 4 to 18, more preferably from 5 to 12. The ferromagnetic powder preferably exhibits a water content of 0.01 to 2%. The water content of the ferromagnetic powder is preferably optimized by the kind of the binder to be used in combination.

The pH value of the ferromagnetic powder is preferably optimized by the kind of the binder to be used in combination. The pH value of the ferromagnetic powder is in the range of generally from 4 to 12, preferably from 6 to 10. The ferromagnetic powder may be subjected to surface treatment with an aluminum compound such as aluminum sulfate, silicon compound such as sodium silicate, or phosphorus compound, if necessary. The amount of Al, Si or P contained in the ferromagnetic powder as the result of the surface treatment is in the range of from 0.1 to 10%. The adsorption of a lubricant such as aliphatic acid by the ferromagnetic powder thus surface-treated is advantageously in the range of not more than 100 mg/m$^2$. The ferromagnetic powder may contain soluble inorganic ions such as Na, Ca, Fe, Ni and Sr ions in some cases. If the content of such the inorganic ion is not more than 200 ppm, there are little remarkable effects on the properties.

The ferromagnetic powder to be used in the present invention preferably has as small void as possible, i.e., preferably not more than 20 vol. %, more preferably not more than 5 vol. %.

The shape of the ferromagnetic particles may be selected from acicular, granular, ellipsoidal, and tabular forms, etc. so as to satisfy the above mentioned requirements for average particle diameter. In order to keep SFD (Switching Field Distribution) of the ferromagnetic powder to not more than 0.6, the distribution of Hc in the ferromagnetic powder needs to be reduced. In order to reduce the distribution of Hc in the ferromagnetic powder, the grain size distribution of goethite may be improved. Further, γ-hematite may be prevented from being sintered.

Next, the non-magnetic layer (i.e., the lower layer) will be described hereinafter in detail.

The non-magnetic layer of the present invention can contain an inorganic non-magnetic powder.

For example, the inorganic non-magnetic powder may be selected from the group consisting of inorganic compounds such as metal oxide, metal carbonate, metal sulfate, metal nitride, metal carbide and metal sulfide. Examples of such the inorganic compound include α-alumina having an α-conversion of 90% or more, β-alumina, γ-alumina, θ-alumina, silicon carbide, chromium oxide, cerium oxide, α-iron oxide, goethite, corundum, silicon nitride, titanium carbide, titanium oxide, silicon dioxide, tin oxide, magnesium oxide, tungsten oxide, zirconium oxide, boron nitride, zinc oxide, calcium carbide, calcium sulfate, barium sulfate and molybdenum disulfate, and singly or in combination thereof. Preferred among these inorganic compounds are titanium dioxide, zinc oxide, α-iron oxide and barium sulfate because of good availability, low cost, narrow gain size distribution and ease of provision of their functions. Particularly preferred among these inorganic compounds is titanium dioxide and α-iron oxide. The average grain diameter of such the inorganic non-magnetic powder is preferably in the range of 0.005 to 2 μm. If necessary, inorganic non-magnetic powders having different average grain diameters may be used in combination. Alternatively, a single inorganic non-magnetic powder having a wide distribution of grain diameter may be used to exert the same effects. In a particularly preferred embodiment, the average grain diameter of inorganic non-magnetic powder is preferably in the range of from 0.01 to 0.2 μm. The tap density (measured under the condition of number of tapping: 150 and head: 30 mm) of the inorganic non-magnetic powder is preferably in the range of from 0.05 to 2 g/ml, more preferably from 0.2 to 1.5 g/ml. The water content of the inorganic non-magnetic powder is preferably in the range of from 0.1 to 5% by weight, more preferably from 0.2 to 3% by weight, most preferably from 0.3 to 1.5% by weight. The pH value of the inorganic non-magnetic powder is preferably in the range of from 2 to 11, particularly preferably from 5 to 10. The specific surface area of the inorganic non-magnetic powder is preferably in the range of from 1 to 100 m$^2$/g, more preferably from 5 to 70 m$^2$/g, most preferably from 10 to 65 m$^2$/g. The crystallite size of the inorganic non-magnetic powder is preferably in the range of from 0.004 to 1 μm, more preferably from 0.04 to 0.1 μm. The oil absorption of the non-magnetic powder is preferably in the range of from 5 to 100 ml/100 g, more preferably from 10 to 80 ml/100 g, most preferably from 20 to 60 ml/100 g as determined with dibutyl phthalate (DBP). The specific gravity of the inorganic non-magnetic powder is preferably in the range of from 1 to 12, more preferably from 3 to 6. The shape of the inorganic non-magnetic powder may be any of acicular, spherical, polyhedral and tabular forms.

The ignition loss of the inorganic non-magnetic powder is preferably not more than 20% by weight and most preferably 0% by weight. The Mohs' hardness of the foregoing inorganic non-magnetic powder which can be used in the present invention is preferably in the range of from 4 to 10. The roughness factor of the surface of the. inorganic non-magnetic powder is preferably in the range of from 0.8 to 1.5, more preferably from 0.9 to 1.2. The inorganic non-magnetic powder exhibits an SA (stearic acid) adsorption of preferably from 1 to 20 μmol/m$^2$, more preferably from 2 to 15 μmol/m$^2$. The inorganic non-magnetic powder to be contained in the lower coating layer preferably exhibits a wetting heat by water of from 200 erg/cm$^2$ to 600 erg/cm$^2$ at a temperature of 25° C. Alternatively, a solvent having a wetting heat defined in the above range may be used. The optimum number of water molecules on the surface of the inorganic non-magnetic powder at a temperature of from 100° to 400° C. is in the range of 1 to 10/100 A. The pH value of the isoelectric point in water is preferably in the range of from 3 to 6.

The surface of the inorganic non-magnetic powder is preferably treated to cover at least a part of the surface thereof with $Al_2O_3$, $SiO_2$, $TiO_2$, $ZrO_2$, $SnO_2$, $Sb_2O_3$, ZnO or $Y_2O_3$, more preferably with $Al_2O_3$, $SiO_2$, $TiO_2$ or $ZrO_2$, and most preferably with $Al_2O_3$, $SiO_2$ or $ZrO_2$ in the light of dispersibility. The inorganic non-magnetic powder may be covered with a single compound or a mixture thereof. A surface-covered layer obtained by coprecipitation may be used depending on the purpose. Alternatively, the inorganic non-magnetic powder may be treated to cover with alumina, followed by the treatment to cover with silica, and vice versa. The surface-covered layer may be porous depending on the purpose. In general, the surface-covered layer is preferably homogeneous and dense.

Specific examples of the inorganic non-magnetic powder to be contained in the non-magnetic layer of the present invention include Nanotite (manufactured by Showa Denko K.K.), HIT-100, ZA-G1 (manufactured by Sumitomo Chemical Co., Ltd.), α-hematite, DPN-250, DPN-250BX, DPN-245, DPN-270BX (manufactured by Toda Kogyo Corp.), TTO-51B, TTO-55A, TTO-55B, TTO-55C, TTO-55S, TTO-55D, SN-100, α-hematite E270, E271, E300 (manufactured by Ishihara Sangyo Kaisha Ltd.), STT-4D, STT-30D, STT-30, STT-65C (manufactured by Titan Kogyo K.K.), MT-100S, MT-100T, MT-150W, MT-500B, MT-600B, MT-100F, MT-500HD (manufactured by Teika Co., Ltd.), FINEX-25, BF-1, BF-10, BF-20, ST-M (manufactured by Sakai Chemical Industry Co., Ltd.), DEFIC-Y, DEFIC-R (manufactured by Dowa Mining Co., Ltd.), AS2BM, TiO2P25 (manufactured by Nihon Aerogel K.K.), 100A, 500A (manufactured by Ube Industries, Ltd.), and Y-LOP (manufactured by from Titan Kogyo K.K.) and calcined product thereof.

Particularly preferred examples of inorganic non-magnetic powder are titanium dioxide and α-iron oxide (α-$Fe_2O_3$). The α-iron oxide (hematite) may be produced under the following conditions. In other words, the α-$Fe_2O_3$ powder of the present invention is produced from an acicular goethite obtained by any of the following methods as a precursor. (1) A method which comprises passing an oxygen-dontaining gas through a suspension containing ferrous hydroxide colloid obtained by adding the equal or greater amount of an aqueous solution of alkali hydroxide to an aqueous solution of ferrous salt at pH 11 or higher at a temperature of not higher than 80° C. so that the reaction system undergoes oxidation reaction to produce an acicular goethite powder. (2) A method which comprises passing an oxygen-containing gas through a suspension containing $FeCO_3$ obtained by the reaction of an aqueous solution of ferrous salt with an aqueous solution of alkali carbonate so that the reaction system undergoes oxidation reaction to produce a spindle-shaped goethite powder. (3) A method which comprises passing an oxygen-containing gas through an aqueous solution of ferrous salt containing ferrous hydroxide colloid obtained by the addition of less than the equal amount of an aqueous solution of alkali hydroxide or alkali carbonate to an aqueous solution of ferrous salt to produce an acicular goethite powder, adding an aqueous solution of alkali hydroxide to the aqueous solution of ferrous salt containing said acicular goethite powder in an amount of not less than the equal amount of $Fe^{2+}$ in the aqueous solution of ferrous salt, and then passing an oxygen-containing gas through the reaction system for growth of the acicular goethite powder. (4) A method which comprises passing an oxygen-containing gas through an aqueous solution of ferrous salt containing ferrous hydroxide colloid obtained by the addition of less than the equal amount of an aqueous solution of alkali hydroxide or alkali carbonate to an aqueous solution of ferrous salt so that the reaction system undergoes oxidation reaction to produce an acicular goethite powder, and then being subjected the acicular goethite powder to growth in a pH region ranging from acid to neutrality.

Hetero elements such as Ni, Zn, P and Si which are commonly added for improvement of the properties of powder may be added during the reaction of production of goethite powder.

The acicular goethite powder as a precursor may be dehydrated at a temperature of from 200° C. to 500° C., and then optionally heat-treated at a temperature of from 350° C. to 800° C. so that it is annealed to obtain an acicular α-$Fe_2O_3$ powder.

The acicular goethite powder to be dehydrated or annealed may have a sintering inhibitor such as P, Si, B, Zr and Sb attached to the surface thereof.

The reason why the acicular particulate goethite is annealed by heat treatment at 350° to 800° C. is that the pore produced on the surface of the acicular α-$Fe_2O_3$ powder obtained by dehydration is filled with a molten metal from the uppermost surface of the grain upon annealing to provide a smooth surface.

The α-$Fe_2O_3$ powder which can be used in the present invention may be obtained by a process which comprises dispersing the foregoing acicular α-$Fe_2O_3$ powder obtained by dehydration or annealing in an aqueous solution to obtain a suspension, adding an Al compound to the suspension, adjusting the pH value of the suspension so that the surface of the α-$Fe_2O_3$ powder is covered by the additive compound, filtering the material, rinsing the material, drying the material, grinding the material, and then optionally subjecting the material to deaeration, compaction, etc. As the Al compound to be used there may be employed an aluminum salt such as aluminum acetate, aluminum sulfate, aluminum chloride and aluminum nitrate or alkali aluminate such as sodium aluminate. The amount of the Al compound to be added is from 0.01 to 50% by weight based on the weight of α-$Fe_2O_3$ powder in the term of Al. If the amount of the Al compound to be added is below 0.01% by weight, the dispersion of the Al compound is insufficient. If the amount of the Al compound to be added exceeds 50% by weight, the Al compound pieces suspended on the surface of the grain disadvantageously interact with each other. The inorganic non-magnetic powder to be incorporated in the lower layer of the present invention may be covered by the Al compound as well as Si compound and at least one compound selected from the group consisting of P, Ti, Mn, Ni, Zn, Zr, Sn and Sb compounds. The amount of such compounds to be used with the Al compound are each from 0.01 to 50% by weight based on the weight of α-$Fe_2O_3$ powder. If the amount of these compounds is below 0.01% by weight, it exerts little or no effect of improving dispersibility. On the contrary, if the amount of these compounds exceeds 50% by weight, the compounds suspended in zones other than the surface of the grain disadvantageously interact with each other.

The preparation of titanium dioxide will be described hereinafter. The preparation of titanium dioxide can be mainly accomplished by sulfuric acid process or chlorine process. In the sulfuric acid process, ilumenite ore is digested with sulfuric acid to extract Ti, Fe, etc. as sulfates. Iron sulfate is then removed by crystallization. The residual titanyl sulfate solution is purified by filtration, and then thermally hydrolyzed to cause hydrous titanium hydroxide to be precipitated. The hydrous titanium hydroxide thus precipitated is filtered, and then washed. Impurities are removed by washing. A grain diameter adjustor or the like is then added to the material. The material is then calcined at a temperature of 80° to 1,000° C. to produce coarse titanium dioxide. The titanium dioxide is of rutile type or anatase type depending on the kind of nucleating agent added upon hydrolyzation. The coarse titanium dioxide may be ground, classified, and then subjected to surface treatment, etc. to produce the desired inorganic non-magnetic powder. In the chlorine process, as the ore there is used natural rutile or synthetic rutile. The ore is chlorinated in a high temperature reduced condition so that Ti is converted to $TiCl_4$ and Fe is converted to $FeCl_2$. Iron oxide solidified by cooling is separated from the liquid $TiCl_4$. The resulting crude $TiCl_4$ is then purified by fractionating. To $TiCl_4$ is then added a nucleating agent. The reaction mixture is momentarily reacted with oxygen at a temperature of not lower than 1,000° C. to obtain crude titanium dioxide. The crude titanium dioxide produced by the oxidative decomposition process is then subjected to finishing in the same manner as in the sulfate process to serve as a pigment.

In the surface treatment, the foregoing crude titanium dioxide is dry-ground, wet-ground with water and a dispersant, and then subjected to centrifugal separation to remove coarse particles. The resulting fine slurry is transferred to the surface treatment tank where it is then coated with a metal hydroxide. In some detail, a predetermined amount of an aqueous solution of a salt such as Al, Si, Ti, Zr, Sb, Sn and Zn is prepared in the surface treatment tank. The aqueous salt solution is then neutralized with an acid or alkali to produce a hydrous oxide with which the surface of titanium dioxide particles is coated. The water-soluble salts by-produced are removed by decantation, filtration and washing. The slurry is adjusted for a proper pH, filtered, and then washed with pure water. The cake thus washed is then dried by a spray dryer or band dryer. The dried material is finally ground by a jet mill to provide a product. Instead of being treated in an aqueous system, the titanium dioxide powder may be subjected to surface treatment with Al or Si by passing $AlCl_3$ or $SiCl_4$ vapor through the powder, and then introducing water vapor thereinto. For the preparation of other pigments, reference can be made to G. D. Parfitt and K. S. W. Sing, "Characterization of Powder Surfaces", Academic Press, 1976.

A carbon black may be incorporated in the non-magnetic layer to reduce the surface electric resistance Rs and the light transmittance, which is a well-known effect, as well as provide a desired micro Vickers hardness. The micro Vickers hardness of the non-magnetic layer is normally from 25 to 60 $kg/mm^2$, preferably from 30 to 50 $kg/mm^2$ for well-controlled head contact. The micro vickers hardness of the specimen is determined by means of a thin film hardness tester HMA-400 (manufactured by NEC Co., Ltd.). The foot of the penetrator used is a triangular pyramid made of diamond with a sharpness of 80° and a radius of 0.1 $\mu$m. The light transmittance is normally defined such that the percent absorption of infrared rays having a wavelength of about 900 nm is not more than 3%, particularly not more than 0.8% for VHS tape. To this end, furnace black for rubber, thermal black for rubber, black for coloring, acetylene black, etc. may be used.

The carbon black exhibits a specific surface area of generally from 100 to 500 $m^2/g$, preferably from 150 to 400 $m^2/g$, and an oil absorption of from 20 to 400 ml/100 g, preferably from 30 to 200 ml/100 g as determined with DBP. The carbon black exhibits an average particle diameter of generally from 5 to 80 m$\mu$, preferably from 10 to 50 m$\mu$, particularly preferably from 10 to 40 m$\mu$. The carbon black preferably exhibits a pH value of 2 to 10, a water content of from 0.1 to 10% and a tap density of 0.1 to 1 g/ml . Specific examples of the carbon black employable in the present invention include BLACKPEARLS 2000, 1300, 1000, 900, 800, 880, 700, VULCAN XC-72 (manufactured by Cabot Corp.), #3050B, 3150B, 3250B, #3750B, #3950B, #950, #650B, #970B, #850B, MA-600, MA-230, #400, #4010 (manufactured by Mitsubishi Kasei Corp.), CONDUCTEX SC, RAVEN 8800, 8000, 7000, 5750, 5250, 3500, 2100, 2000, 1800, 1500, 1255, 1250 (manufactured by Columbia Carbon Corp.), and Ketjen Black EC (manufactured by Akzo Co., Ltd.). These carbon blacks may be surface-treated with a dispersant, grafted with a resin or partially graphtized before use. These carbon blacks may be added to the magnetic coating solution in the form of dispersion in a binder. These carbon blacks may be used in an amount of less than 50% by weight based on the weight of the foregoing inorganic non-magnetic powder or less than 40% by weight based on the total weight of the non-magnetic layer. These carbon blacks may be used singly or in combination.

For the details of the carbon black employable in the present invention, reference can be made to "Handbook of Carbon Black", Carbon Black Kyokai.

Further, an organic powder may be incorporated in the non-magnetic layer depending on the purpose. For example, acrylstyrene resin powder, benzoguanamine resin powder, melamine resin powder, and phthalocyanine pigment may be used. Further, polyolefin resin powder, polyester resin powder, polyamide resin powder, polyimide resin powder, and polyfluoroethylene resin may be used. The preparation of these organic powders can be accomplished by the method as described in JP-A-62-18564 (the term "JP-A" as used herein means an unexamined published Japanese patent application) and JP-A-60-255827.

It is a common practice to provide a undercoating layer in an ordinary magnetic recording medium to enhance the adhesive strength between the support and the magnetic layer, etc. The thickness of the undercoating layer is normally in the range of not more than 0.5 $\mu$m.

For the binder, lubricant, dispersant, additives and solvent to be incorporated in the non-magnetic layer and the method for dispersing these components, those used for the magnetic layer (i.e., the upper layer) can be employed. In particular, for the amount and kind of the binder, additives and dispersant, the well-known technique for the magnetic layer can be employed.

As the binder resin to be used in the present invention there can be used known thermoplastic resins, thermosetting resins, reactive resins or mixture thereof. As the thermoplastic resins there can be used those having a glass transition temperature of from −100° C. to 150° C., a number-average molecular weight of from 1,000 to 200,000, preferably from 10,000 to 100,000, and a polymerization degree of from about 50 to 1,000.

Examples of such the thermoplastic resins include polymers or copolymers containing as constituent units vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, vinyl ether, etc., polyurethane resins, and various rubber resins. Examples of the above mentioned thermosetting resins or reactive resins include phenol resin, epoxy resin, polyurethane hardening resin, urea resin, melamine resin, alkyd resin, acrylic reactive resin, formaldehyde resin, silicone resin, epoxy-polyamide resin, mixture of polyester resin and isocyanate prepolymer, mixture of polyester polyol and polyisocyanate, and mixture of polyurethane and polyisocyanate. These resins are further described in "Plastic Handbook", Asakura Shoten. Further, well-known electron radiation curing resins can be incorporated in either the non-magnetic layer or magnetic layer.

Examples of these resins and their preparation methods are further described in JP-A-62-256219. These resins can be used singly or in combination. Preferred examples of such the combination of resins include a combination of at least one selected from vinyl chloride resin, vinyl chloride-vinyl acetate resin, vinyl chloride-vinyl acetate-vinyl alcohol resin and vinyl chloride-vinyl acetate-maleic anhydride copolymer with a polyurethane resin, and a combination thereof with polyisocyanate. Examples of the structure of polyurethane resins which can be used in the present invention include known structures such as polyester polyurethane, polyether polyurethane, polyether polyester polyurethane, polycarbonate polyurethane, polyester polycarbonate polyurethane, polycaprolactone polyurethane and polyolefin polyurethane. Of all these binders, those in which at least one polar group selected from —COOM, —SO$_3$M, —OSO$_3$M, —P=O(OM)$_2$, —O—P=(OM)$_2$ (in which M represents a hydrogen atom or alkaline metal salt group), —OH, —NR$^2$, —N$^+$R$^3$ (in which R is a hydrocarbon group), epoxy group, —SH, —CN, sulfobetaine, phosphobetaine, and carboxybetaine has been introduced by copolymerization or addition reaction may be preferably used to obtain better dispersibility and durability. The amount of such the polar group is in the range of preferably from $10^{-1}$ to $10^{-8}$ mol/g, more preferably from $10^{-2}$ to $10^{-6}$ mol/g.

Specific examples of these binders which can be used in the present invention include VAGH, VYHH, VMCH, VAGF, VAGD, VROH, VYES, VYNC, VMCC, XYHL, XYSG, PKHH, PKHJ, PKHC and PKFE (manufactured by Union Carbide), MPR-TA, MPR-TA5, MPR-TAL, MPR-TSN, MPR-TMF, MPR-TS, MPR-TM and MPR-TAO (manufactured by Nissin chemical Industry Co., Ltd.), 1000W, DX80, DX81, DX82, DX83 and 100FD (manufactured by Electro Chemical Industrial Co., Ltd.), MR-1 04, MR-105, MR110, MR100, 400X-110A (manufactured by Nippon Zeon Co. Ltd.), Nippollan N2301, N2302 and N2304 (manufactured by Nippon Polyurethane, Co., Ltd.), T-5105, T-R3080 and T-5201, Burnock D-400 and D-210-80, and Crisvon 6109 and 7209 (manufactured by Dainippon Ink And Chemicals, Inc.), Vylon UR8200, UR8300, RV530 and RV280 (manufactured by Toyobo Co., Ltd.), Dipheramine 4020, 5020, 5100, 5300, 9020, 9022 and 7020 (manufactured by Dainichi Seika K.K.), MX5004 (manufactured by Mitsubishi Chemical Corporation), Sunprene SP-150 and TIM-3003 (manufactured by Sanyo Chemical Industries Co., Ltd.), and Salan F310 and F210 (manufactured by Asahi Chemical Industry Co., Ltd.). Preferred among these compounds are MR-104, MR110, MPR-TA, UR-8200 and UR8300.

The content of the binder to be contained in the magnetic layer of the present invention is in the range of generally from 5 to 25% by weight, preferably from 8 to 22% by weight based on the weight of ferromagnetic particles. When a vinyl chloride resin is used, its content is preferably in the range of from 5 to 30% by weight. When a polyurethane resin is used, its content is preferably in the range of from 2 to 20% by weight. When a polyisocyanate is used, its content is preferably in the range of 2 to 20% by weight. These binder resins are preferably used in these amounts in combination. It is preferred that the magnetic layer is free of polyisocyanate while the non-magnetic layer contains a polyisocyanate.

In the present invention, when polyurethane is used, its glass transition temperature, breaking extension, breaking stress and yield point are preferably in the range of from −50° C. to 100° C., from 100 to 2,000%, from 0.05 to 10 kg/cm$^2$ and from 0.05 to 10 kg/cm$^2$, respectively.

The magnetic recording medium of the present invention consists of two layers or more. Accordingly, it goes without saying that the amount of the binder, the amount of vinyl chloride resin, polyurethane resin, polyisocyanate or other resins to be contained in the binder, the molecular weight of resins constituting the magnetic layer, the amount of polar group, or the physical properties of the above mentioned resins can be altered according to the non-magnetic layer and the magnetic layer. The well-known technique for multi-layer magnetic layer can be employed. For example, if the amount of the binder differs between each the layers, it is useful to increase the amount of the binder to be contained in the magnetic layer in order to reduce the generation of scratch on the surface of the magnetic layer. In order to improve the touch of the magnetic recording medium to the head, the amount of the binder to be contained in layers other than the magnetic layers may be increased to render the magnetic recording medium flexible.

Examples of polyisocyanates which can be used in the present invention include isocyanates such as tolylenediisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, the reaction products of these isocyanates with polyalcohols, and polyisocyanates produced by the condensation of isocyanates. Examples of the trade names of these commercially available isocyanates include Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), Desmodur L, Desmodur IL, Desmodur N and Desmodur HL (manufactured by Sumitomo Bayer Co., Ltd.), and Burnock D502 (manufactured by Dainippon Ink & Chemicals, Inc.). These isocyanates may be used singly. Alternatively, by making the best use of the difference in hardening reactivity, two or more of these isocyanates can be used in combination in both the non-magnetic layer and magnetic layer.

As carbon black which can be incorporated in the present invention there can be used furnace black for rubber, thermal black for rubber, black for coloring, acetylene black, etc. Such the carbon black preferably has a specific surface area of from 5 to 500 m$^2$/g, DBP oil absorption of from 10 to 400 ml/100 g, average grain diameter of from 5 m$\mu$ to 300 m$\mu$, pH value of from 2 to 10, water content of 0.1 to 10%, and tap density of 0.1 to 1 g/ml. Specific examples of carbon black which can be used in the present invention include BLACKPEARLS 2000, 1300, 1000, 900, 800, 880, 700, VULCAN and XC-72 (produced by Cabot Co., Ltd.), #80, #60, #55, #50, and #35 (produced by Asahi Carbon Co., Ltd.), #2400B, #2300, #5, #900, #950, #970, #1000, #30, #40, and #10B (produced by Mitsubishi Chemical Kasei Corporation), CONDUCTEX SC and RAVEN 150, 50, 40 and 15 (produced by Columbia Carbon Co., Ltd.). These carbon blacks may be surface-treated with a dispersant, grafted with a resin or partially graphtized before use. These carbon blacks may be previously dispersed in a binder before being added to the nonmagnetic coating solution. These carbon blacks may be used singly or in combination. When carbon black is used, its content is preferably in the range of from 0.1 to 30% based on the weight of ferromagnetic powder. Carbon black serves to inhibit the electrification of the magnetic layer, reduce the frictional coefficient, provide light-shielding effect, enhance the film strength, etc. These functions vary with the kind of carbon black used. It goes without saying that these carbon blacks may be different in its kind, content and combination from the upper magnetic layer and the lower coating layer or non-magnetic layer depending on the previously specified properties such as grain size, oil absorption, electrical conductivity and pH. For carbon blacks which can be incorporated in the upper layer of the present invention, reference can be made to "Handbook of Carbon Black", Carbon Black Kyokai.

Specific examples of abrasives to be used in the present invention include α-alumina having an alpha conversion of not less than 90%, β-alumina, γ-alumina, silicon carbide, chromium oxide, cerium oxide, α-iron oxide, corundum, artificial diamond, silicon nitride, silicon carbide, titanium carbide, titanium oxide, silicon dioxide, and boron nitride. In general, known materials having a Mohs' hardness of not less than 6 are used singly or in combination. A composite material made of these abrasives (abrasives surface-treated with another abrasive) may be used. These abrasives may contain compounds or elements other than main component but exert similar effects so far as the content of the main component is not less than 90%. The grain size of these abrasives is preferably in the range of from 0.01 to 2 μm. If necessary, a plurality of abrasives having different grain sizes may be used in combination or a single abrasive having a wide grain diameter distribution may be used to provide similar effects. The tap density of these abrasives is preferably in the range of from 0.3 to 2 g/ml. The water content of these abrasives is preferably in the range of from 0.1 to 5%. The pH value of these abrasives is preferably in the range of from 2 to 11. The specific surface area of these abrasives is preferably in the range of from 1 to 30 m²/g. The abrasives which can be used in the present invention may be in the form of acicular, spherical and die-like shapes. The abrasives which can be used in the present invention may preferably have edges partially on the surface thereof to provide a high abrasion. Specific examples of abrasives which can be used in the present invention include AKP-20, AKP-30, AKP-50, HIT-50, HIT-60, HIT-80, HIT-80G, and HIT-100 (manufactured by Sumitomo Chemical Co., Ltd.), G5, G7, and S-1 (manufactured by Nippon Chemical Industrial Co., Ltd.), and TF-100, and TF-140 (manufactured by Toda Kogyo Co., Ltd.). The abrasives which can be used in the present invention can be varied in the kind, content and combination from the lower coating layer to the upper layer depending on the purpose. These abrasives may be incorporated in the magnetic coating solution in the form of dispersion in a binder. The member of the abrasive which is present on the surface and edge of the magnetic layer in the magnetic recording medium of the present invention is preferably in the range of not less than 5 grains/100 μm².

As the additives which can be used in the present invention there can be used those having a lubricating effect, an antistatic effect, a dispersing effect, a plasticizing effect, etc. Examples of the additives include molybdenum disulfide, tungsten disulfide, graphite, boron nitride, fluorinated graphite, silicone oil, silicone having a polar group, aliphatic acid-modified silicone, fluorine-containing silicone, fluorine-containing alcohol, fluorine-containing ester, polyolefin, polyglycol, ester alkylphosphate and alkaline metal salt thereof, alkyl-sulfuric acid ester and alkaline metal salt thereof, polyphenyl ether, fluorine-containing alkyl-sulfuric acid ester and alkaline metal salt thereof, monoaliphatic ester, dialiphatic ester or trialiphatic ester of monobasic aliphatic acid having 10 to 24 carbon atoms (which may contain an unsaturated bond or may be branched) and salt thereof with metals (e.g., Li, Na, K, Cu), monovalent, divalent, trivalent, tetravalent, pentavalent and hexavalent alcohol having 12 to 22 carbon atoms (which may contain an unsaturated bond or may be branched), alkoxy alcohol having 12 to 22 carbon atoms or monobasic aliphatic acid having 10 to 24 carbon atoms (which may contain an unsaturated bond or may be branched) with one of monovalent, divalent, trivalent, tetravalent, pentavalent and hexavalent alcohols having 2 to 12 carbon atoms (which may contain an unsaturated bond or may be branched), aliphatic ester of monoalkyl ether of alkylene oxide polymer, aliphatic amide having 8 to 22 carbon atoms, aliphatic amine having 8 to 22 carbon atoms, etc. can be used.

Specific examples of such the additives include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol. Further, non-ionic surface active agents such as alkylene oxide, glycerin, glycidol and alkylphenolethylene oxide addition product; cationic surface active agents such as cyclic amine, ester amide, quaternary ammonium salt, hydantoin derivative, heterocyclic compound, phosphonium and sulfonium; anionic surface active agents containing polar groups such as carboxylic acid, sulfonic acid, phosphoric acid, sulfuric acid ester and phosphoric acid ester; amphoteric surface active agents such as amino acid, aminosulfonic acid, sulfuric or phosphoric acid ester of amino alcohol and alkylbetaine, etc. can be used. These surface active agents are further described in "Kaimen Kasseizai Binran (Handbook of Surface Active Agents)", Sangyo Tosho K.K. These lubricants, antistatic agents, etc. may not be necessarily 100% pure but may contain impurities such as isomer, unreacted material, by-product, decomposition product and oxide. The concentration of these impurities is preferably in the range of not less than 30%, more preferably not more than 10%.

These lubricants and surface active agents which can be used in the present invention may be varied in their kind and content in each the layers as necessary. For example, aliphatic acids may be varied in its melting point in the non-magnetic layer and the magnetic layer to control the oozing thereof to the surface. Esters may be varied in its boiling point or polarity in the interlayer and the magnetic layer to control the oozing thereof to the surface. The content of surface active agents may be controlled to improve the coating stability. The content of a lubricant in the non-magnetic may be higher than that in the magnetic layer to improve the lubricating effect. It goes without saying that the present invention is not limited to these examples.

The additives which can be used in the present invention may be entirely or partially added to the system at any steps during the preparation of the magnetic coating solution. For example, these additives may be mixed with magnetic particles before kneading. Further, these additives may be added to the system at the step of kneading magnetic particles with a binder and a solvent. Alternatively, these additives may be added to the system during or after the dispersion step or immediately before the coating step. Depending on the purpose, additives may be partially or entirely applied by the simultaneous or successive coating method after the application of the magnetic layer. Further, a lubricant may be applied to the surface of the magnetic layer after calendering or slitting depending on the purpose.

Examples of the trade name of these lubricants which can be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, castor oil-cured fafty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl Iaurate, and erucic acid (manufactured by Nippon Oils And Fats Co., Ltd.), oleic acid (manufactured by Kanto Chemical Co., Ltd.), FAL-205 and FAL-123 (manufactured by Takemoto Yushi K.K.), Enujerubu LO, Enujerubu IPM and Sansosyzer E4030 (manufactured by Shin Nihon Rika Co., Ltd.), TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 (manufactured by The Shin-Etsu Chemical Co., Ltd.), Armide P, Armide C, and Armoslip CP (manufactured by Lion Armor Co., Ltd.), Duomine TDO (manufactured by Lion Fat and Oil Co., Ltd.), BA-41 G (manufactured by Nisshin Oil Mills, Co., Ltd.), and Profan 2012E, New Pole PE61, Ionet MS-400, Ionet MO-200, Ionet DL-200, Ionet DS-300, Ionet DS-1000, and Ionet DO-200 (manufactured by Sanyo Chemical Co., Ltd.).

Examples of organic solvents which can be used in the present invention include ketones such as acetone, methyl ethyl ketone, methyl isobutyl ketone, diisobutyl ketone, cyclohexanone, isophorone and tetrahydrofuran; alcohols such as methanol, ethanol, propanol, butanol, isobutyl alcohol, isopropyl alcohol and methyl cyclohexanol; esters such as methyl acetate, butyl acetate, isobutyl acetate, isopropyl acetate, ethyl butyrate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chloroform, ethylene chlorohydrin and dichlorobenzene; N,N-dimethylformamide, and hexane. These organic solvents may be used in any proportions. These organic solvents are not necessarily 100% pure and may contain impurities such as isomers, unreacted matters, by-products, decomposition products, oxides and water content besides main components. The content of these impurities is preferably in the range of not more than 30%, more preferably not more than 10%. The kind of organic solvents which can be used in the present invention may be the same in the magnetic layer and the non-magnetic layer. A solvent having a high surface tension (e.g., cyclohexanone, dioxane) may be used for the non-magnetic layer to enhance the coating stability. Specifically, it is essential that the arithmetic mean of the solvent composition for the magnetic layer is not smaller than that of the solvent composition for the non-magnetic layer. In order to enhance the dispersibility, the polarity of the organic solvent is preferably somewhat high. The solvents to be used for these layers preferably contain a solvent having a dielectric constant of from 15 to 20 in an amount of not less than 50%. The solubility parameter of these solvents is preferably in the range of from 8 to 11.

In the thickness of the magnetic recording medium of the present invention, the thickness of the non-magnetic support is preferably in the range of from 1 to 100 $\mu$m. In particular, it is effective that a non-magnetic support having a thickness of from 1 to 8 $\mu$m is used. The sum of the thickness of the magnetic layer and the non-magnetic layer is preferably in the range of from 1/100 to 2 times the thickness of the non-magnetic support. An adhesive layer may be provided between the non-magnetic support and the non-magnetic layer to enhance the adhesion. The thickness of the adhesive layer is in the range of generally from 0.01 to 2 $\mu$m, preferably from 0.02 to 0.5 $\mu$m. A back coating layer may be provided on the other side of the non-magnetic support. The thickness of the back coating layer is in the range of generally from 0.1 to 2 $\mu$m, preferably from 0.3 to 1.0 $\mu$m. As these adhesive and back coating layers there can be used well-known layers.

The non-magnetic support which can be used in the present invention has a micro Vickers hardness of not less than 75 kg/mm$^2$. As such the non-magnetic support there can be used any well-known film such as biaxially-oriented polyethylene naphthalate, polyamide, polyimide, polyamideimide, aromatic polyamide and polybenzoxidazole. In particular, a non-magnetic support comprising an alamide resin is preferred. These non-magnetic support materials may be previously subjected to corona discharge, plasma treatment, easy adhesion treatment, heat treatment, dust-removing treatment, etc. In order to accomplish the objects of the present invention, it is necessary to use a non-magnetic support having a center-line average (surface) roughness of preferably 0.1 nm to 10 nm, more preferably 0.2 nm to 6 nm, most preferably 0.5 nm to 4 nm. Such the non-magnetic support preferably not only has a small center-line average (surface) roughness but also has no big protrusions having a height of 1 $\mu$m or more. The shape of the surface roughness may be freely controlled by the size and amount of filler to be incorporated in the nonmagnetic support as necessary. Examples of the filler include oxide and carbonate of Al, Ca, Si, and Ti, regardless of whether it is crystalline or amorphous, and finely divided powder of organic compound such as acryl and melamine. In order to meet the requirements both for surface roughness and running durability, it is preferred that the roughness of the non-magnetic support on the backcoating layer side be greater than that on the magnetic layer side. The center line average (surface) roughness of the non-magnetic support on the backcoating layer side is preferably not less than 1 nm, more preferably not less than 4 nm. In the case where the roughness on the magnetic layer side is different from that on the backcoating layer side, a support having a dual structure may be used. Alternatively, a coating layer may be provided to provide different surface roughnesses.

The non-magnetic support which can be used in the present invention preferably exhibits F-5 (i.e., the load at the 5% elongation) values of from 10 to 50 kg/mm$^2$ in the tape-running direction and from 10 to 30 kg/mm$^2$ in the tape-width direction. In general, F-5 value in the tape-running direction is higher than F-5 value in the tape-width direction. However, if the strength in the tape-width direction of the nonmagnetic support needs to be high, the present invention is not limited to this specification. The non-magnetic support exhibits a heat shrinkage in the running and width direction of preferably not more than 3%, more preferably not more than 1.5% at 100° C. for 30 minutes, and preferably not more than 1%, more preferably not more than 0.5% at 80° C. for 30 minutes. Further, the breaking strength of the non-magnetic support is preferably in the range of from 5 to 100 kg/mm$^2$ in both directions. The elastic modulus of the non-magnetic support is preferably in the range of from 100 to 2,000 kg/mm$^2$ in both directions. In the present invention, the light transmittance at a wavelength of 900 nm is preferably not more than 30%, more preferably not more than 3%.

The process for the preparation of the magnetic coating solution for the magnetic layer in the magnetic recording medium of the present invention comprises at least kneading step, dispersion step, and mixing step which is optionally provided before or after these steps. These steps each may consist of two or more stages. The raw materials to be used in the present invention, e.g., ferromagnetic particles, binder resin, carbon black, abrasive, antistatic agent, lubricant and solvent may be added to the system at the beginning or during any step. These raw materials each may be batchwise added to the system at two or more steps. For example, polyurethane may be batchwise charged in the system at the kneading step, dispersion step or a mixing step for the viscosity adjustment after dispersion. In order to accomplish the objects of the present invention, a conventionally well-known preparation technique can, of course, be used as a step. In the kneading step, an apparatus having a strong kneading power such as continuous kneader and pressure kneader can be preferably used for obtaining a magnetic recording medium having a high Br. When a continuous kneader or pressure kneader is used, the ferromagnetic powders are kneaded with the whole or part (preferably 30% by weight or more of the total weight of all binder resins) of the binder in an amount of from 15 to 500 parts by weight based on 100 parts by weight of ferromagnetic powders. These kneading techniques are further described in JP-A-1-166338 and JP-A-64-79274. In the preparation of the magnetic layer solution, non-magnetic layer solution and abrasives, a dispersion medium having a high specific gravity is preferably used. Zirconia beads and metal beads are suitable.

As examples of the apparatus and methods for coating of a magnetic recording medium having a multi-layer structure according to the present invention there can be proposed the following examples:

1. Gravure coating method, roll coating method, blade coating method, extrusion coating method or the like, which is normally used in the application of a magnetic coating, is employed to provide a lower coating layer. An magnetic layer is then applied to the non-magnetic layer by means of a support pressure type extrusion coating apparatus as disclosed in JP-B-1-46186, JP-B-60-238179, and JP-B-2-265672 while the non-magnetic layer is in the wet state.

2. An upper layer and a lower layer are applied almost simultaneously by means of a coating head having two coating passage slits as disclosed in JP-A-63-88080, JP-A-2-17921, and JP-A-2-265672.

3. An upper layer and a lower layer are applied almost simultaneously by means of an extrusion coating apparatus with a backup roll as disclosed in JP-A-2-174965.

In order to inhibit the agglomeration of ferromagnetic powder that deteriorates the electromagnetic characteristics of the magnetic recording medium, a method as disclosed in JP-A-62-95174 and 1-236968 can be used to provide the coating solution inside the coating head with a shearing force. For the viscosity of the coating solution, the range disclosed in JP-A-3-8471 should be satisfied.

In order to obtain a magnetic recording medium according to the present invention, a strong orientation needs to be effected. A solenoid having 1,000 G or more and a cobalt magnet having 2,000 G or more are preferably used in combination in such an arrangement that the same pole of the two magnets are opposed to each other. Further, a proper drying process is preferably provided before the orientation step to maximize the orientability after drying. It has been known that a high density recording can be effectively accomplished by inclining the axis of easy magnetization to the vertical direction regardless of whether the grain is acicular or tabular. This method can be used as well.

Well-known methods are preferably used additionally to enhance the adhesive property. For example, an adhesive layer mainly composed of a polymer may be provided prior to the simultaneous multiple layered coating of non-magnetic layer and magnetic layer. Alternatively, the non-magnetic support may be subjected to corona discharge, irradiation with UV or irradiation with EB.

The magnetic recording medium of the present invention preferably exhibits a frictional coefficient of from 0.1 to 0.5, more preferably from 0.2 to 0.3, to SUS420J on the magnetic layer side and the other side. The magnetic layer preferably has a surface inherent resistance of from $10^4$ to $10^{12}$ $\Omega$/sq. The magnetic layer preferably exhibits an elastic modulus of from 100 to 2,000 kg/mm$^2$ at 0.5% elongation in both the tape-running direction and tape-width direction. The breaking strength of the magnetic layer is preferably in the range of from 1 to 30 kg/cm$^2$. The elastic modulus of the magnetic recording medium is preferably in the range of from 100 to 1,500 kg/mm$^2$ in both the tape-running direction and tape-width direction. The residual elongation of the magnetic recording medium is preferably in the range of not more than 0.5%. The heat shrinkage of the magnetic recording medium at all temperatures of 100° C. or less is preferably not more than 1%, more preferably not more than 0.5%, most preferably not more than 0.1%, particularly preferably 0%. The glass transition temperature of the non-magnetic layer is preferably from 0° C. to 100° C. The loss elastic modulus of the magnetic layer is preferably in the range of from $1\times10^8$ to $8\times10^9$ dyne/cm$^2$. The loss tangent of the magnetic layer is preferably in the range of not more than 0.2. If the loss tangent of the magnetic layer is too great, it can easily suffer from faulty due to adhesion. The amount of the residual solvent to be contained in the magnetic layer is preferably in the range of not more than 100 mg/m$^2$, more preferably not more than 10 mg/m$^2$. The amount of the residual solvent to be contained in the magnetic layer is preferably less than that of the non-magnetic layer. The non-magnetic layer and the magnetic layer each preferably has voids of not more than 30 vol. %, more preferably not more than 20 vol. %. The voids are preferably small to provide a high output. In some cases, certain voids are preferably secured depending on the purpose. For example, in the case of magnetic recording media for data recording, repeated use of which is particularly needed, the voids are preferably great to provide excellent running durability.

In the magnetic characteristics of the magnetic recording medium of the present invention measured by means of VSM under a magnetic field of 10 KOe, Hc in the tape running direction is preferably from 2,000 to 3,000 Oe, more preferably from 2,100 to 2,500 Oe. The squareness ratio is preferably in the range of not less than 0.75, more preferably not less than 0.80, most preferably not less than 0.85 in the tape running direction. The squareness ratio in two directions perpendicular to the tape running direction is preferably in the range of not more than 80% of that in the tape running direction. SFD of the magnetic layer is preferably in the range of not more than 0.6, more preferably not more than 0.5, ideally 0. The remanent coercive force Hr in the longitudinal direction is preferably from 1,800 Oe to 3,000 Oe. Hc and Hr in the vertical direction are each preferably from 1,000 Oe to 5,000 Oe.

The RMS surface roughness (RRMS) of the magnetic layer determined by AFM evaluation is preferably in the range of from 2 nm to 15 nm.

The magnetic recording medium of the present invention comprises a non-magnetic layer and a magnetic layer. It can easily be presumed that the physical properties of the magnetic recording medium may be altered from the non-magnetic layer to the magnetic layer. For example, the elastic modulus of the magnetic layer can be enhanced to improve the running durability thereof while the elastic modulus of the non-magnetic layer can be lower than that of the magnetic layer to improve the contact of the magnetic recording medium with the head. Further, the method for raising the tensility of the support may be used to improve the head contact in the present invention. A support the tensility of which has been raised in the direction perpendicular to the longitudinal direction of the tape can often exhibit a good head contact.

EXAMPLE

The present invention will be further described in the following examples and comparative examples, but the present invention should not be construed as being limited thereto. The term "parts" as used herein indicates "parts by weight".

Examples 1–18; Comparative Examples 1–5:

| Lower coating layer (non-magnetic layer): Coating formulation a: | |
|---|---|
| Inorganic non-magnetic powder: α-Fe$_2$O$_3$ hematite | 80 parts |
| Long axis length: 0.15 μm | |
| Specific surface area | |
| (determined by BET method): 52 m$^2$/g | |
| pH: 6 | |
| Tap density: 0.8 | |
| Surface-covering compound: Al$_2$O$_3$, SiO$_2$ | |
| Carbon black | 20 parts |
| Average primary particle diameter: 16 μm | |
| DBP oil absorption: 80 ml/100 g | |
| pH: 8.0 | |
| Specific surface area | |
| (determined by BET method): 250 m$^2$/g | |
| Volatile content: 1.5% | |
| Vinyl chloride copolymer ("MR-110" manufactured by Nippon Zeon Co., Ltd.) | 12 parts |
| Polyester polyurethane resin | 5 parts |
| Neopentyl glycol/caprolactone polyol/MDI: 0.9/2.6/1 (by mol) | |
| —SO$_3$Na group content: 1 × 10$^{-4}$ eq/g | |
| α-Al$_2$O$_3$ (average particle diameter: 0.2 μm) | 1 part |
| Butyl stearate | 1 part |
| Stearic acid | 1 part |
| Methyl ethyl ketone | 100 parts |
| Cyclohexanone | 50 parts |
| Toluene | 50 parts |

| Lower coating layer (non-magnetic layer): Coating formulation b: | |
|---|---|
| Inorganic non-magnetic powder: TiO$_2$ (titanium oxide) | 80 parts |
| Grain diameter: 0.022 μm | |
| Specific surface area (determined by BET method): 75 m$^2$/g | |
| pH: 7.5 | |
| DBP oil absorption: 27–38 g/100 g | |
| Surface covering agent: Al$_2$O$_3$, SiO$_2$ | |
| Carbon black | 20 parts |
| Average primary particle diameter: 16 μm | |
| DBP oil absorption: 80 ml/100 g | |
| pH: 8.0 | |
| Specific surface area (determined by BET method): 250 m$^2$/g | |
| Volatile content: 1.5% | |
| Vinyl chloride copolymer ("MR-104" manufactured by Nippon Zeon Co., Ltd.) | 12 parts |
| Polyester polyurethane resin | 5 parts |
| Neopentyl glycol/caprolactone polyol/MDI: 0.9/2.6/1 (by mol) | |
| —SO$_3$Na group content: 1 × 10$^{-4}$ eq/g | |
| α-Al$_2$O$_3$ (average particle diameter: 0.2 μm) | 1 part |
| Butyl stearate | 1 part |
| Stearic acid | 1 part |
| Methyl ethyl ketone | 100 parts |
| Cyclohexanone | 50 parts |
| Toluene | 50 parts |

| Magnetic coating solution (magnetic layer): Coating formulation a': | |
|---|---|
| Ferromagnetic metal powder A to E (shown in Table 1) | 100 parts |
| Polyurethane A to H (shown in Tables 2-1, 2-2) | 12 parts |
| α-Alumina (average grain diameter: 0.15 μm) | 5 parts |
| Carbon black (average grain diameter: 0.08 μm) | 0.5 parts |
| Butyl stearate | 1 part |
| Stearic acid | 5 parts |
| Methyl ethyl ketone | 90 parts |
| Cyclohexanone | 30 parts |
| Toluene | 60 parts |

| Magnetic coating solution (magnetic layer): Coating formulation b': | |
|---|---|
| Ferromagnetic metal powder A to E (shown in Table 1) | 100 parts |
| Vinyl chloride copolymer ("MR-110," manufactured by Nippon Zeon Co., Ltd.) | 12 parts |
| Polyurethane A to H (shown in Tables 2-1, 2-2) | 5 parts |
| α-Alumina (average grain diameter: 0.2 μm) | 1 part |
| Butyl stearate | 1 part |
| Stearic acid | 1 part |
| Methyl ethyl ketone | 100 parts |
| Cyclohexanone | 50 parts |
| Toluene | 50 parts |

TABLE 1

| Ferromagnetic metal powder | A | B | C | D | E |
|---|---|---|---|---|---|
| Composition: | | | | | |
| Co/Fe (atm-%) | 0.1> | 10.0 | 30.0 | 30.1 | 30.2 |
| Ni/Fe (atm-%) | 9.2 | 0.1> | 0.1> | 0.1> | 0.1> |
| Al/Fe (atm-%) | 0.1> | 9.5 | 11.0 | 12.8 | 9.2 |
| Y/Fe (atm-%) | 0.1> | 0.1> | 2.0 | 6.3 | 9.7 |
| Si/Fe (atm-%) | 1.5 | 0.1> | 0.1> | 0.1> | 0.1> |
| Hc (Oe) | 1,540 | 1,560 | 1,780 | 2,230 | 2,250 |
| σS (emu/g) | 129 | 120 | 131 | 138 | 142 |
| $S_{BET}$ (m$^2$/g) | 48 | 59 | 56 | 56 | 56 |
| Crystallite size (Å) | 200 | 160 | 187 | 187 | 182 |
| Long axis length (μm) | 0.23 | 0.20 | 0.11 | 0.085 | 0.065 |
| Axial ratio (acicular ratio) | 12 | 13 | 6 | 4 | 4 |

TABLE 2-1

| Polyurethane | A | B | C | D | E | F | G |
|---|---|---|---|---|---|---|---|
| Radius of gyration (nm) | 9 | 16.5 | 4.0 | 15.6 | 25 | 50 | 50 |
| Urethane group concentration (meq/g) | 1.0 | 2.2 | 0.5 | 2.6 | 4.5 | 9.0 | 9.0 |
| Number-average molecular weight ×10,000 | 3.9 | 3.8 | 4.2 | 4.3 | 4.3 | 4.3 | 5.7 |
| Fg (°C.) | 39 | 39 | 64 | 64 | 64 | 64 | 21 |
| Structure (molar ratio) | | | | | | | |
| Neopentyl glycol | 2.5 | 1.3 | 9.6 | 1.3 | 0.5 | 0.3 | 0.25 |
| Hydroxycaproic acid | 3.1 | 1.6 | — | — | — | — | 0.25 |
| Phthalicacid | 2.8 | 1.8 | 13.2 | 1.8 | 0.7 | 0.4 | 0.3 |
| Diphenylmethane isocyanate | 1.0 | 1.0 | 1.0 | 1.0 | 1.0 | 1.0 | 1.0 |
| Cyclohexanedimethanol | — | 2.1 | 0.3 | 0.1 | 0.07 | — | — |
| Hydroxypivalic acid | — | 2.4 | 0.3 | 0.1 | 0.08 | — | — |
| —SO$_3$Na group (10$^{-5}$ eq/g) | 6.5 | 6.5 | 6.5 | 6.5 | 6.5 | 6.5 | 8 |

TABLE 2-2

| Polyurethane | H |
|---|---|
| Radius of gyration (nm) | 22 |
| Urethane group concentration (meq/g) | 4.0 |
| Ether group concentration (meq/g) | 5.0 |
| Number-average molecular weight (×10,000) | 2.5 |
| Tg (°C.) | 94 |
| Structure (molar ratio) | |
| HBpA *1) | 0.6 |
| Compound A *2) | 0.3 |
| DEIS *3) | 0.05 |
| MDI *4) | 1.0 |
| TMP *5) | 0.05 |
| —SO$_3$Na group (10$^{-5}$ eq/g) | 6.0 |

*1) Hydrogenated bisphenol A ("Ricabinol HB" manufactured by Shin-Nihonrika K. K.)
*2) Polypropyleneoxide adduct of bisphenol A (M. W. 600)
*3) Sodium salt of bis(2-hydroxyethyl)sulfophthalate
*4) 4,4'-Diphenylmethanediisocyanate
*5) Trimethylolpropane In order to prepare the foregoing various coating solutions, the foregoing components were kneaded by an open kneader, and then subjected to dispersion by a sand mill. 5 parts of a polyisocyanate ("Coronate L", manufactured by Nippon Polyurethane Co., Ltd.) were added to the coating solution of lower coating (non-magnetic) layer and the coating solution of magnetic layer. 40 parts of a mixture solvent of methyl ethyl ketone and cyclohexanone were added to the coating solution of lower coating (non-magnetic) layer and the coating solution of magnetic layer, respectively. The two mixtures were each filtered through a filter having an average pore diameter of 1 μm to prepare the desired coating solution of non-magnetic layer and coating solution of magnetic layer, respectively.

The coating solution of non-magnetic layer thus obtained was simultaneously multiplelayer-coated on a polyethylene naphthalate support having a thickness of 5.5 μm and a center line average surface roughness of 0.002 μm to obtain a dry thickness of 1.2 μm. The coating solution of magnetic layer was immediately applied to the non-magnetic layer to obtain a dry thickness as shown in Tables 3 to 8. The coated support was then oriented by a cobalt magnet having a magnetic force of 3,000 G and a solenoid having a magnetic force of 1,500 G while the two layers coated were wet. The coated support thus oriented was then dried. The coated support dried was then treated at a temperature of 90° C. by a 7-step calender singly composed of metal roll at a rate of 200 m/min and a linear pressure of 270 Kg/cm. Thereafter, a back layer having a thickness of 0.5 μm was applied to the coated support. The coated support was slitted into 8-mm wide web to prepare various 8-mm video tapes as shown in Tables 3 to 4 which were then evaluated by the evaluation methods as described below.

TABLE 3

| Sample No. | Example 1 | Example 2 | Example 3 | Comparative Example 1 | Example 4 | Example 5 |
|---|---|---|---|---|---|---|
| Ferromagnetic metal powder | D | D | D | D | D | D |
| Polyurethane | A | B | H | C | D | E |
| Magnetic layer formulation | a | a | a | a | a | a |
| Lower coating (non-magnetic) layer formulation | a | a | a | a | a | a |
| Magnetic layer thickness | 0.14 | 0.15 | 0.15 | 0.15 | 0.14 | 0.14 |
| Tg (°C.) of magnetic layer | 71 | 71 | 90 | 71 | 91 | 91 |
| Maximum magnetic flux density Bm(G) | 3,950 | 4,160 | 4,210 | 4,170 | 4,140 | 4,230 |
| Squareness ratio SQ | 0.78 | 0.84 | 0.87 | 0.80 | 0.83 | 0.84 |
| Surface roughness Ra (nm) | 3.1 | 2.5 | 2.2 | 3.5 | 2.7 | 2.4 |
| Output (dB) at a recording wavelength of 0.488 μm | −1.7 | −0.8 | −0.4 | −2.3 | −1.7 | −1.5 |
| Output (dB) at a recording wavelength of 22 | −1.1 | −1.4 | −1.3 | −1.3 | −1.3 | −2.9 |
| Overwriting erasure rate (dB) | −21 | −22 | −21 | −21 | −22 | −22 |

| Sample No. | Example 6 | Comparative Example 2 | Comparative Example 3 | Example 7 | Example 8 |
|---|---|---|---|---|---|
| Ferromagnetic metal powder | D | D | A | B | D |
| Polyurethane | D | F | E | E | E |
| Magnetic layer formulation | a | a | b | b | a |
| Lower coating (non-magnetic) layer formulation | b | a | a | a | a |
| Magnetic layer thickness | 0.16 | 0.15 | 0.15 | 0.14 | 0.14 |
| Tg (°C.) of magnetic layer | 91 | 91 | 91 | 91 | 91 |
| Maximum magnetic flux density Bm(G) | 4,270 | 3,920 | 3,700 | 3,400 | 4,140 |
| Squareness ratio SQ | 0.84 | 0.78 | 0.92 | 0.92 | 0.84 |
| Surface roughness Ra (nm) | 2.5 | 5.5 | 3.2 | 2.5 | 2.7 |
| Output (dB) at a recording wavelength of 0.488 μm | −1.4 | −3.5 | −3.8 | −2.5 | −1.7 |
| Output (dB) at a recording wavelength of 22 | −2.4 | −3.5 | −1.0 | −1.3 | −1.3 |
| Overwriting erasure rate (dB) | −21 | −19 | −25 | −26 | −22 |

| Sample No. | Example 9 | Example 10 | Comparative Example 4 | Example 11 | Example 12 |
|---|---|---|---|---|---|
| Ferromagnetic metal powder | D | E | D | D | D |
| Polyurethane | E | E | E | E | E |
| Magnetic layer formulation | b | b | a | a | b |
| Lower coating (non-magnetic) layer formulation | a | a | a | a | a |
| Magnetic layer thickness | 0.16 | 0.16 | 0.05 | 0.13 | 0.20 |
| Tg (°C.) of magnetic layer | 91 | 91 | 91 | 91 | 91 |
| Maximum magnetic flux density Bm(G) | 4,070 | 4,200 | 4,140 | 4,070 | 4,140 |
| Squareness ratio SQ | 0.86 | 0.81 | 0.84 | 0.86 | 0.84 |
| Surface roughness Ra (nm) | 2.3 | 2.2 | 2.9 | 2.3 | 2.7 |
| Output (dB) at a recording wavelength of 0.488 μm | −1.6 | −1.3 | −2.8 | −1.6 | −1.7 |
| Output (dB) at a recording wavelength of 22 | −0.8 | −0.8 | −1.3 | −0.8 | −1.3 |
| Overwriting erasure rate (dB) | −22 | −22 | −33 | −22 | −20 |

| Sample No. | Example 13 | Comparative Example 5 |
|---|---|---|
| Ferromagnetic metal powder | D | E |
| Polyurethane | E | E |
| Magnetic layer formulation | a | a |
| Lower coating (non-magnetic) layer formulation | a | a |
| Magnetic layer thickness | 0.80 | 1.0 |
| Tg (°C.) of magnetic layer | 91 | 91 |
| Maximum magnetic flux density Bm(G) | 4,970 | 4,200 |
| Squareness ratio SQ | 0.86 | 0.81 |
| Surface roughness Ra (nm) | 2.6 | 2.1 |
| Output (dB) at a recording wavelength of 0.488 μm | −2.5 | −2.9 |
| Output (dB) at a recording wavelength of 22 | −0.8 | −0.8 |
| Overwriting erasure rate (dB) | −19 | −16 |

TABLE 4

| Sample No. | Example 14 | Example 15 | Example 3 | Example 16 | Example 17 | Example 18 | Comparative Example 5 |
|---|---|---|---|---|---|---|---|
| Ferromagnetic metal powder | D | D | D | D | D | D | D |
| Polyurethane | E | E | H | E | E | B | G |
| Magnetic layer formulation | a | a | a | b | b | a | a |
| Lower coating (non-magnetic) layer formulation | b | a | a | b | a | a | a |
| Magnetic layer thickness | 0.14 | 0.13 | 0.14 | 0.14 | 0.15 | 0.14 | 0.13 |
| Tg (°C.) of magnetic layer | 90 | 90 | 90 | 90 | 90 | 74 | 64 |
| Running durability | Good | Good | Good | Good | Good | Fair | Fair |
| Head corrosion | Good | Good | Good | Fair | Fair | Good | Good |

[Evaluation Method]
<Measurement of Thickness of Magnetic Layer>

The magnetic recording medium was cut in the longitudinal direction by a diamond cutter to a (tape) web having a width of about 0.1 μm. The section of the specimen was then observed and photographed under a transmission electron microscope at 30,000 power. The print size of the photograph was A4 (210 mm×297 mm). Thereafter, paying attention to the difference in the shape of ferromagnetic powder and non-magnetic powder between the magnetic layer and the non-magnetic layer, the interface of the two layers was marked black on the photograph. Similarly, the surface of the magnetic layer was marked black on the photograph. The distance between the two black marking lines was then measured by an image analyzer ("IBAS2" manufactured by Carl Zeiss Stiftung Co., Ltd.). The measurement was effected at various points along a length of 21 cm on the photograph. The arithmetic mean of the measurements were then divided by the magnification power to calculate the thickness of the magnetic layer.

<Surface Roughness Ra of Magnetic Layer>

The surface of the magnetic recording medium was measured for Ra on the area of about 250 nm×250 nm by the MIRAU method using a light interference three-dimensional roughness meter ("TOPO3D" manufactured by WYKO (Arizona, USA)). The measurement wavelength was about 650 nm. Spherical surface correction and cylinder correction were made on the measurements.

<Electromagnetic Characteristics>

Output at a Recording a Wavelength of 0.488 μm and 22 μm

As a reference tape there was used a reference ME tape (manufactured by Fuji Photo Film Co., Ltd.). Using an external contact drum tester, the sample was measured for output at a relative speed of 10.2 m/sec. The magnetic head used was a Fe head having Bs of 1.5 T. The value recorded and reproduced at the optimum recording current defined below was used.

The output at a recording wavelength of 0.488 μm is preferably high. The output at a recording wavelength of 22 μm is preferably from −2 dB to +2 dB.

<Overwriting Erasure Rate>

Using an external contact drum tester, a rectangular signal having a recording wavelength of 22 μm was recorded on the sample. The recorded signal was then reproduced from the sample, and its output was then measured. A rectangular signal having a recording wavelength of 0.488 μm was then recorded on the same sample. The recorded signal was then reproduced from the sample, and the output of the signal having a recording wavelength of 22 μm was then read out by a spectral analyzer. The overwriting erasure rate is represented by the ratio of the output of the signal having a recording wavelength of 22 μm measured before superposed recording to the output of the signal having a recording wavelength of 22 μm measured after superposed recording. The overwriting erasure rate is preferably not more than −20 dB as calculated in terms of absolute value.

<Head Corrosion>

The sample was allowed to stand at a temperature of 60° C. and a relative humidity of 90% RH with its magnetic layer kept in contact with a specimen having a permalloy sputtered film on a PET base for 1 week. The specimen was then evaluated for corrosion on the permalloy film under a microscope at a magnification of 50 powers. The sample was observed over 10 fields of view. In the above tables, "Good" indicates that no corrosion is observed, "Fair" indicates that one point of corrosion is observed, and "Poor" indicates that one or more points of corrosion are observed.

<Running Durability>

The tape specimen was allowed to run 100 times through a 8-mm video deck ("FUJIX8" manufactured by Fuji Photo Film Co., Ltd.) at a temperature of 23° C. and 70% RH. Ten video decks were used for ten specimens, respectively. During this running test, the output drop was measured. After the running test, contamination on various parts in the deck was evaluated.

Good: The output drop is less than 3 dB, and no contamination is visually observed on various parts in the deck.

Fair: The output drop is less than 3 dB, but much contamination is visually observed on various parts in the deck.

Poor: The output drop is not less than 3 dB, and much contamination is visually observed on various parts in the deck.

As mentioned above, the magnetic recording medium of the present invention comprises a binder resin containing a polyurethane resin having a specific radius of gyration to form an extremely thin magnetic layer containing a finely divided ferromagnetic powder. Thus, the magnetic recording medium of the present invention can perform a high density recording and exhibits excellent overwrite characteristics, running durability and corrosion resistance.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a magnetic layer mainly comprising a ferromagnetic powder and a binder resin formed on at least one side of a non-magnetic support, wherein said magnetic layer has a thickness of from 0.05 μm to 0.8 μm, said ferromagnetic powder has an average long axis length of from 0.05 μm to 0.20 μm, and said binder resin comprises a polyurethane having a radius of gyration in a range of from 5 to 25 nm in cyclohexanone.

2. The magnetic recording medium as claimed in claim 1, wherein said polyurethane is contained in the magnetic layer in an amount of 50 to 300% by weight based on the ferromagnetic powder.

3. The magnetic recording medium as claimed in claim 1, wherein a content of urethane in said polyurethane is 0.5 to 10 meq/g.

4. The magnetic recording medium as claimed in claim 1, wherein said magnetic layer has a center line average surface roughness Ra of 1 to 4 nm and Tg of 80° C. or more.

5. The magnetic recording medium as claimed in claim 1, wherein said medium further comprising a non-magnetic layer containing an inorganic non-magnetic powder and a binder provided between said magnetic layer and said non-magnetic support.

6. The magnetic recording medium as claimed in claim 5, wherein said non-magnetic powder is selected from titanium oxide or α-iron oxide.

7. The magnetic recording medium as claimed in claim 5, wherein said non-magnetic layer further contains a carbon black.

8. The magnetic recording medium as claimed in claim 1, wherein said polyurethane contains an ether group in an amount of from 0.5 to 9.0 meq/g.

9. The magnetic recording medium as claimed in claim 1, wherein said polyurethane has a number-average molecular weight of from 40,000 to 70,000.

10. The magnetic recording medium as claimed in claim 1, wherein said ferromagnetic powder has Hc from 1,800 to 3,000 Oe and σs from 125 to 180 emu/g.

11. The magnetic recording medium as claimed in claim 1, wherein said ferromagnetic powder has a major axis length of from 0.06 to 0.09 μm.

12. The magnetic recording medium as claimed in claim 1, wherein said magnetic layer comprises a vinyl chloride resin.

13. The magnetic recording medium as claimed in claim 1, wherein said ferromagnetic powder has a crystallite size of from 100 to 250 Å.

14. The magnetic recording medium as claimed in claim 1, wherein said ferromagnetic powder has an acicularity ratio of from 4 to 18.

15. The magnetic recording medium as claimed in claim 1, wherein said ferromagnetic powder has a specific surface area of from 45 to 80 m$^2$/g.

16. The magnetic recording medium as claimed in claim 1, wherein said ferromagnetic powder has a pH value of from 6 to 10.

17. The magnetic recording medium as claimed in claim 1, wherein said polyurethane has the radius of gyration of from 7 nm to 10 nm.

18. The magnetic recording medium as claimed in claim 1, wherein said magnetic layer has a center line average surface roughness of from 1 nm to 4 nm.

* * * * *